(12) United States Patent
Fredericks et al.

(10) Patent No.: US 6,418,877 B1
(45) Date of Patent: Jul. 16, 2002

(54) JETTER CUP

(76) Inventors: James C. Fredericks, 8176 NW. Twin Oaks Dr., Kansas City, MO (US) 64151; Rick McLeod, 13306 E. 51st St., Kansas City, MO (US) 64133

(*) Notice: Subject to any disclaimer, the term of this patent is extended or adjusted under 35 U.S.C. 154(b) by 0 days.

(21) Appl. No.: 09/594,879

(22) Filed: Jun. 15, 2000

(51) Int. Cl.[7] .............................. A01J 5/04; A01J 3/00
(52) U.S. Cl. .................................. 119/14.47; 119/14.18
(58) Field of Search ............................ 119/14.08, 14.18, 119/14.47, 14.48, 14.5, 14.55; 134/22.18

(56) References Cited

U.S. PATENT DOCUMENTS

| | | | |
|---|---|---|---|
| 4,476,808 A | * 10/1984 | Meermoller et al. | 119/14.18 |
| 4,516,592 A | * 5/1985 | Schultz et al | 119/14.18 |
| 5,572,947 A | * 11/1996 | Larson et al. | 119/14.5 |
| 5,863,349 A | * 1/1999 | Laub-Maier et al. | 134/22.18 |
| 6,276,297 B1 | * 8/2001 | van den Berg et al. | 119/14.18 |

OTHER PUBLICATIONS

Alfa Laval Agri 1997 Equipment & Supplies catalog, p. 34.

* cited by examiner

*Primary Examiner*—Charles T. Jordan
*Assistant Examiner*—Elizabeth Shaw
(74) *Attorney, Agent, or Firm*—Hovey Williams LLP

(57) ABSTRACT

A jetter cup for washing milking equipment includes a cup having a sidewall and a bottom wall defining therein a cavity, a tube having a passageway, and an annular lip having a central opening. The jetter cup facilitates insertion of a mouthpiece of a teat cup liner into the cavity by the provision of ramping bosses circumferentially spaced around the outer surface of the lip, a circumferentially extending groove along the inside of the sidewall at the junction between the lip and the sidewall, and the provision of a plurality of upright ribs along the sidewall which preferably extend downwardly to the bottom wall. When the mouthpiece of the liner is inserted into the cavity, the lip snaps back into sealing relationship around the shell of the teat cup to provide a gap between the sidewall and the skirt of the mouthpiece to permit cleaning and rinsing solution to circulate around the mouthpiece including the lower margin thereof. The bosses lessen frictional engagement between the mouthpiece and the lip during insertion and the groove facilitates the lip in yielding and then returning to a sealing position without the need for twisting or pulling on the teat cup.

24 Claims, 3 Drawing Sheets

FIG. 2
PRIOR ART
FIG. 4
PRIOR ART
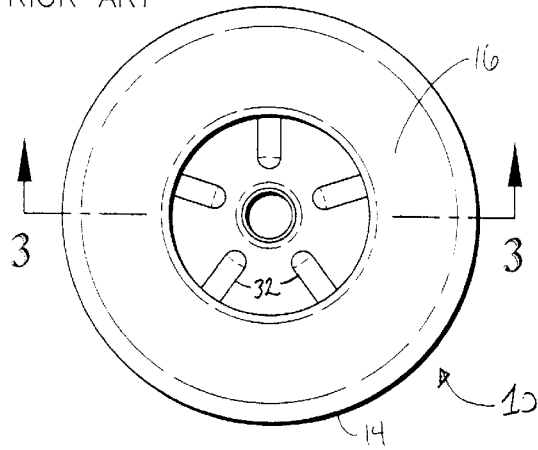
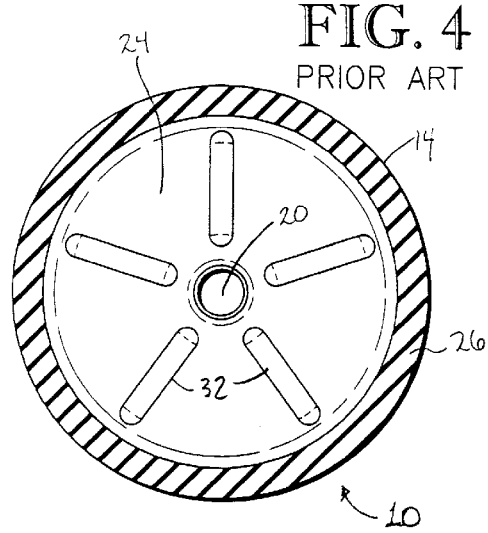
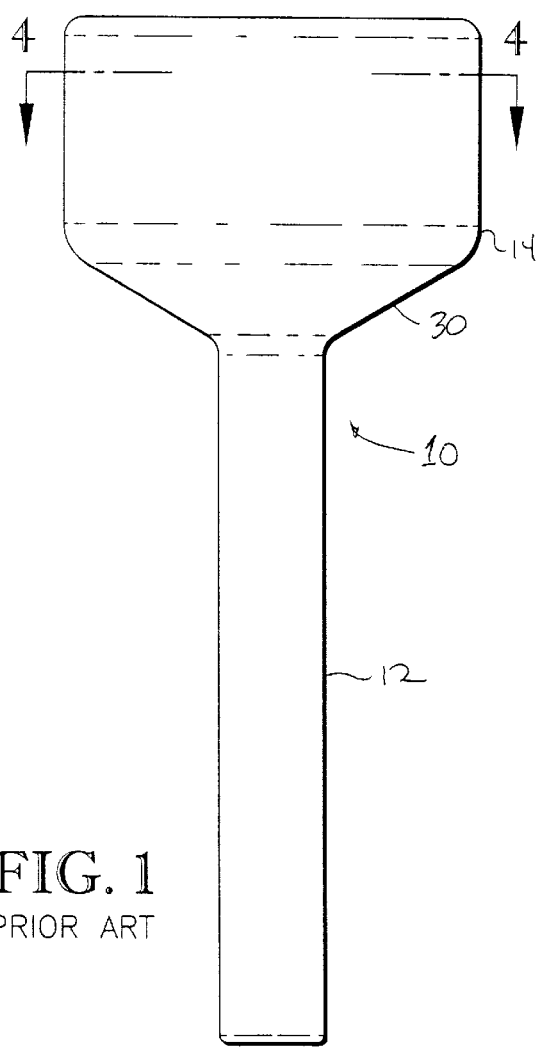
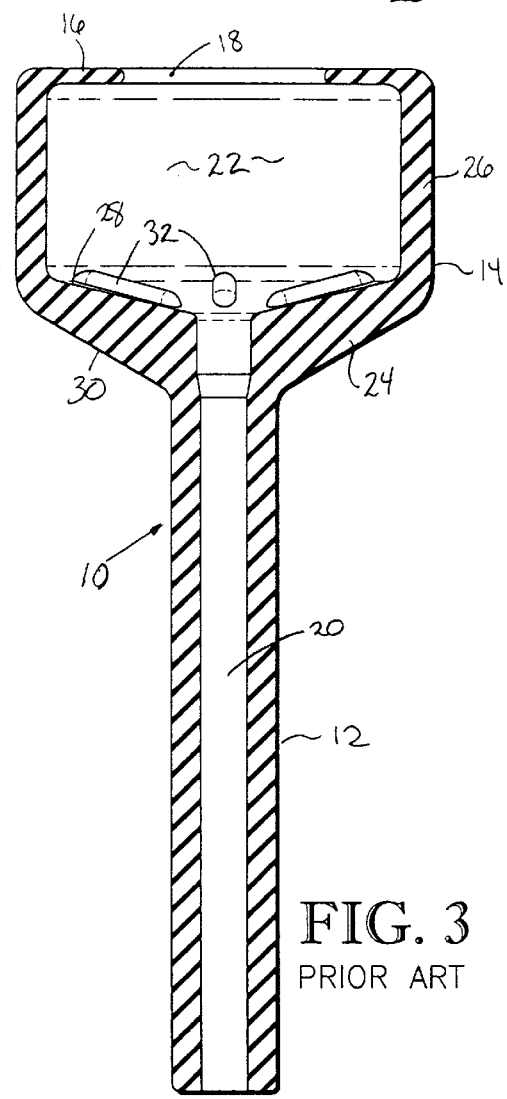
FIG. 1
PRIOR ART
FIG. 3
PRIOR ART

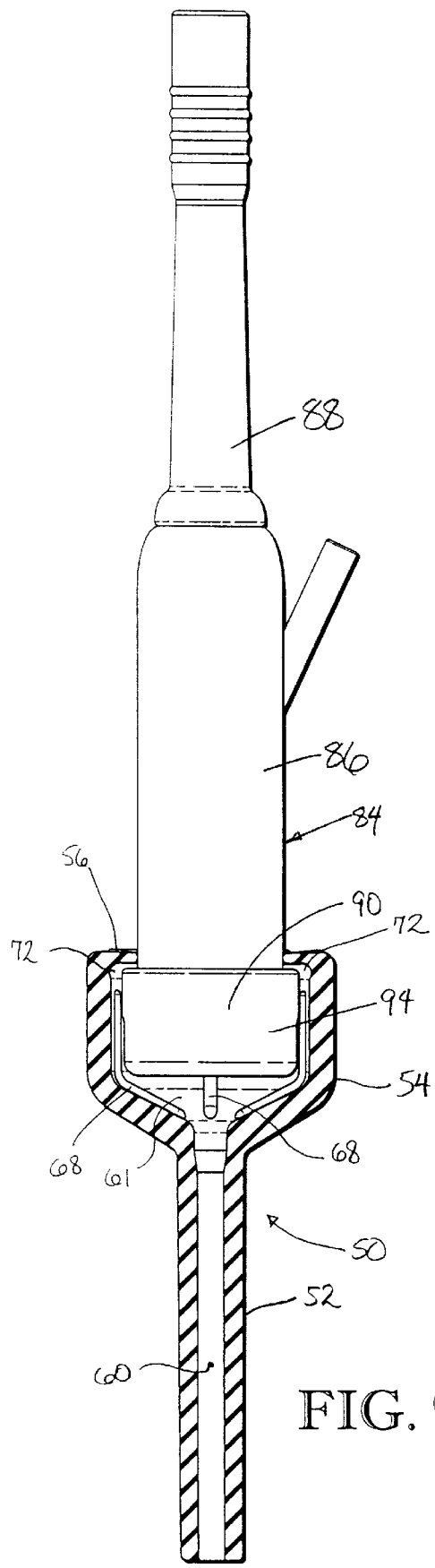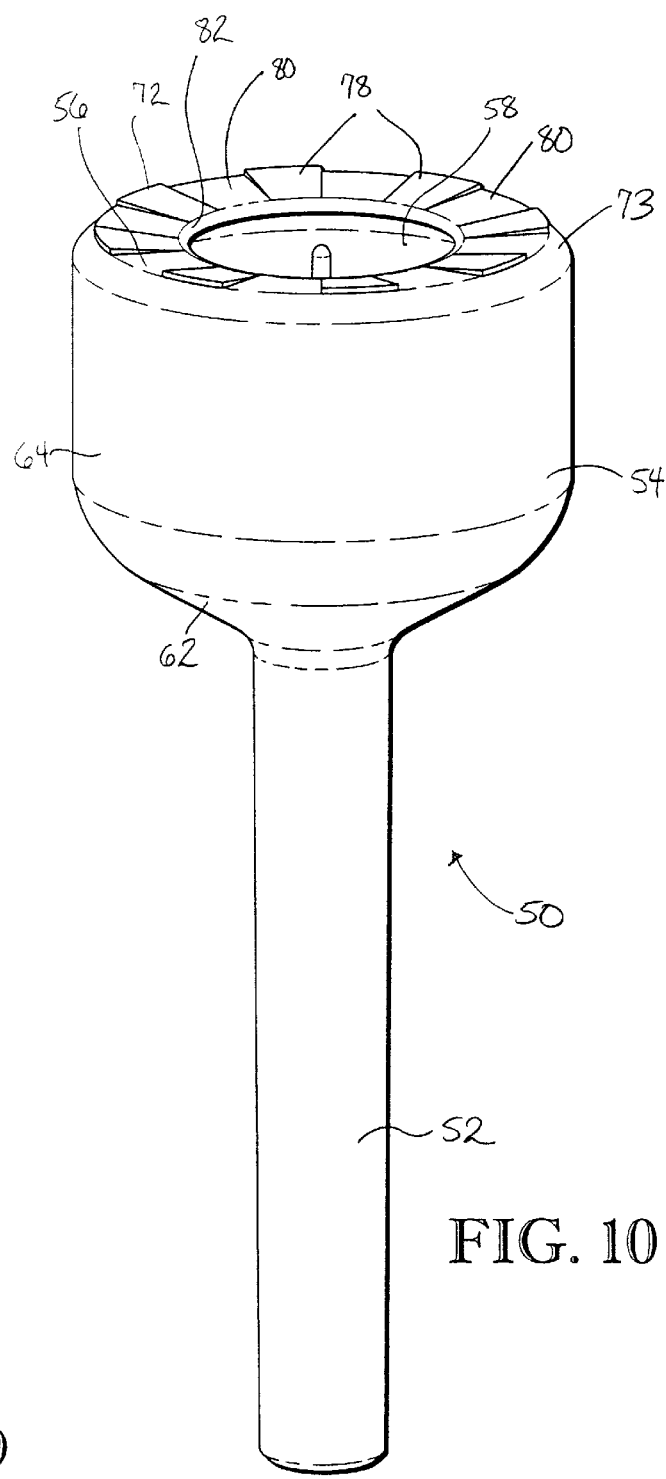
FIG. 9
FIG. 10

JETTER CUP

BACKGROUND OF THE INVENTION

1. Field of the Invention

The present invention concerns rubber jetter cups used for washing milking equipment. More particularly, it is concerned with a jetter cup which facilitates insertion and removal of the teat cups received therein so as to ensure proper seating and, as a result, more effective and complete cleaning.

2. Description of the Prior Art

Automatic milking equipment is used in most commercial dairy farms to milk cows, goats or other dairy animals. Such milking equipment typically includes a plurality of teat cups connected to a milking claw. The teat cups typically include a rubber liner received within a shell, and by the application of alternating vacuum and atmospheric pressure between the liner and the shell, the teat is massaged by the walls of the liner to facilitate milking of the teats of the udder. Continuous vacuum is applied to the interior of the rubber liner which moves the milk from the teats into the liner, then to the claw and to a milk collection receptacle. It is important to clean the liners for purposes of sanitation and to prevent infection of the animals of the herd. In most commercial dairy farms, the number of teat cups and liners necessitates the use of automatic cleaning equipment which employs clean in place (CIP) solutions to wash the rubber liners.

While teat cup liners are of various configurations, they commonly include an enlarged mouthpiece extending around the top of the shell, a liner barrel within the shell, and a short milk tube which extends from the bottom of the shell and connects to the claw. The mouthpiece is cleaned by insertion into a jetter cup, which introduces CIP and rinsing solution into the liner and preferably cleans the outside of the mouthpiece which may have raw milk or debris thereon.

Jetter cups of synthetic rubber are well known in the dairy art and are connected to a source of CIP solution. An opening is provided in an annular lip for the receipt of the mouthpiece of the liner. However, existing jetter cups require careful attention in order to ensure proper use. When the dairyman is busy or inattentive, then the liner is not properly installed, with the lip of the jetter cup curling over the sidewall of the liner. Unless the dairyman fully seats the mouthpiece by both pushing and twisting during insertion, the skirt and bottom edge of the mouthpiece is masked from cleaning and retains microorganisms in the debris such as feces or raw milk collected thereon. In effect, mismounting of the mouthpiece within the jetter cup creates a lagoon for the microorganisms free from washing along the sidewall of the mouthpiece.

Unfortunately, the present condition exists as much as 80% of the time in everyday dairying operations. Existing jetter cups not only require care to ensure proper seating, but are sensitive to changes in the size of the liners. Liners and shells may be provided in different sizes to meet the particular breed of the herd, the desires of the dairyman, or the differences in liners among different suppliers. There has thus developed a need for a jetter cup which is designed to facilitate proper seating, provide better circulation of the CIP fluid when proper seating has occurred, and to properly seat and seal a greater variety of teat cup liners currently on the marketplace.

SUMMARY OF THE INVENTION

These objects have largely been met by the jetter cup of the present invention. That is to say, the present invention provides for positive installation and seating during loading and facilitates unloading of the liner from the jetter cup, provides improved circulation of the CIP liquid around the mouthpiece, avoids caving of the sidewall of the jetter cup, improved sealing of the jetter cup around the shell, and better accommodation of different sizes of teat cup liners. As a result, the jetter cup of the present invention readily accepts the mouthpiece of the liner therein and avoids the need to twist or pull the liner in the jetter cup to ensure proper seating. The annular lip of the jetter cup readily yields during loading and then returns to its initial position while providing improved rigidity of the sidewall of the jetter cup.

These features are accomplished by the provision of various improvements including ramping bosses on the exterior of the annular lip which guide and facilitate loading of the liner, the increased sloping of the bottom wall, the provision of an annular groove at the inner margin of the interior of the annular lip, and the provision of ribs which extend along the interior of the sidewall. The ramping bosses are circumferentially spaced about the lip and slope toward the central opening to reduce frictional contact between the rubber mouthpiece and the annular lip of the jetter cup and gradually lead the mouthpiece into the central opening and interior cavity of the jetter cup. The ramping bosses further cooperate with the lips which taper toward the central opening to facilitate insertion of the mouthpiece while maintaining sealing against the shell. The annular groove or undercut along the inner margin of the interior of the annular lip allows the lip to fully deflect as the mouthpiece is inserted and then return to the desired sealing position. This annular groove avoids the interference which commonly prevents proper seating and return of the lip to its extended, sealing position. The circumferentially spaced ribs along the interior of the sidewall of the jetter cup not only supports the sidewall and inhibits caving of the sidewall during loading, but also enhances the circulation of the CIP solution within the cavity so that the outer surface of the mouthpiece including its skirt is spaced inwardly from the sidewall of the jetter cup. This facilitates circulation of the CIP solution and rinsewater all around the mouthpiece of the liner including its marginal shoulder and skirt.

As a result, the jetter cup of the present invention avoids the necessity of twisting and pulling during insertion of the teatcup liner mouthpiece into the jetter cup to obtain proper seating, and positive and proper insertion is accomplished by simple axial movement of the liner mouthpiece through the central opening and into the cavity of the jetter cup. This and other advantages of the jetter cup hereof will be readily apparent to those skilled in the art with reference to the drawings and detailed description which follows.

BRIEF DESCRIPTION OF THE DRAWINGS

FIG. 1 is a side elevational view of a jetter cup in accordance with the prior art;

FIG. 2 is a top plan view of the prior art jetter cup;

FIG. 3 is a vertical cross-sectional view of the prior art jetter cup taken along line 3—3 of FIG. 1;

FIG. 4 is a horizontal cross-sectional view of the prior art jetter cup taken along line 4—4 of FIG. 1;

FIG. 9 is a vertical cross-sectional view similar to FIG. 7 but showing a teat cup including the shell and teat cup liner in elevation installed on the jetter cup; and FIG. 10 is a perspective view of the jetter cup hereof showing the sloping ramping bosses around the central opening.

DESCRIPTION OF THE PREFERRED EMBODIMENT

Figure 6:
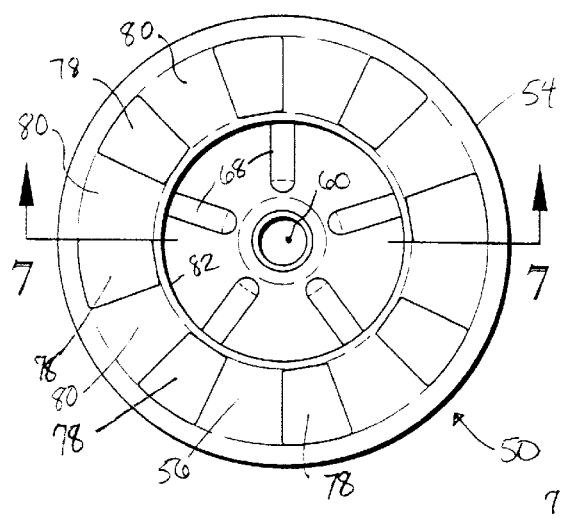
FIG. 6 is a top plan view of our new jetter cup, showing the circumferentially spaced ramping bosses arranged around the annular lip.
Figure 8:
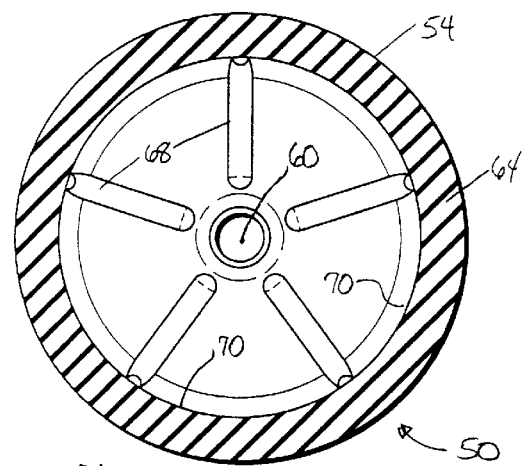
FIG. 8 is a horizontal cross-sectional view taken along line 8—8 of FIG. 5 showing the ribs positioned along the bottom wall and extending upwardly along the sidewall of the jetter cup.
Figure 5:
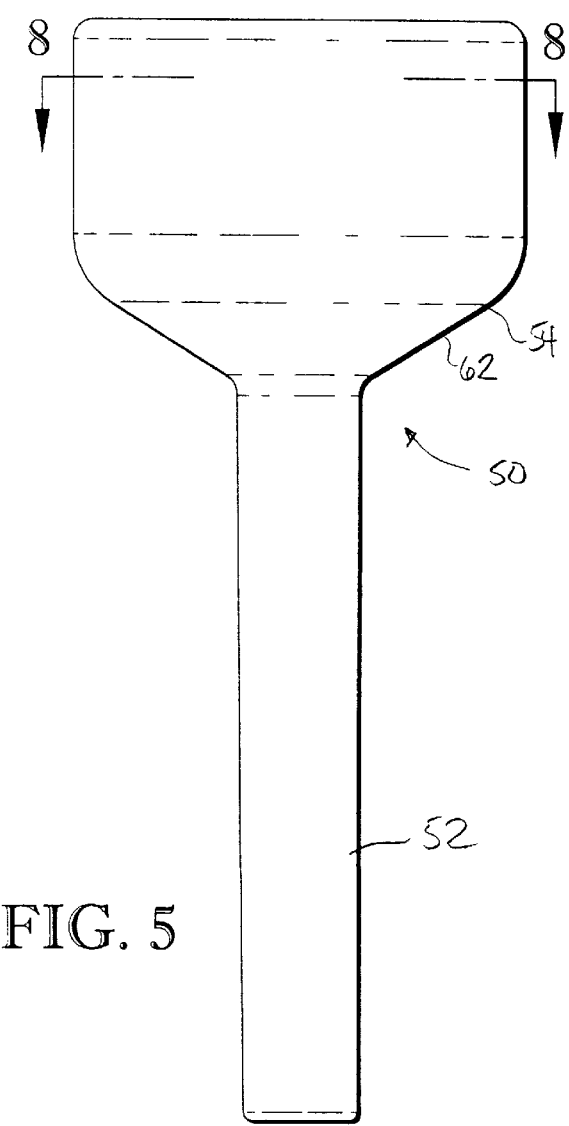
FIG. 5 is a side elevational view of a jetter cup in accordance with the present invention.

Referring now to the drawings, a conventional prior art jetter cup 10 is shown in FIGS. 1 through 4 and includes a flexible connection tube 12, a cup 14 and an inwardly extending annular lip 16 surrounding a central opening 18 for permitting the mouthpiece of a teat cup liner to be inserted therein. The jetter cup 10 is typically of synthetic rubber. The flexible connection tube 12 has a passageway 20 which leads to a cavity 22 within the cup 14 for the introduction of CIP and rinsewater therein. The cup 14 has a bottom wall 24 and a substantially vertical, cylindrical sidewall 26. The bottom wall 24 is of increasing thickness in a direction from the sidewall 26 toward the passageway 20 whereby the slope of the interior 28 of the bottom wall 24 is about 14° downward from the horizontal and less than the slope of the exterior 30 of the bottom wall 24. The interior 28 of the bottom wall 24 is additionally provided with a plurality of ribs 32 which are circumferentially spaced but do not extend to or along the sidewall 26. The annular lip 16 is of substantially the same thickness as it extends inwardly from the sidewall 24 to the central opening 18 and is smooth on both its interior and exterior surface.

An improved jetter cup 50 in accordance with the present invention is shown in FIGS. 5 through 10 and is made of a rubber compound. The jetter cup 50 hereof includes a flexible connection tube 52, a cup 54 and an inwardly extending annular lip 56 surrounding a central opening 58 as is found in the prior art jetter cup 10. Furthermore, the flexible connection tube 52 has a passageway 60 which leads to a cavity 61 within the cup 54 for the receipt of a mouthpiece of a teat cup liner and the introduction of CIP and rinsewater therein.

Figure 7:
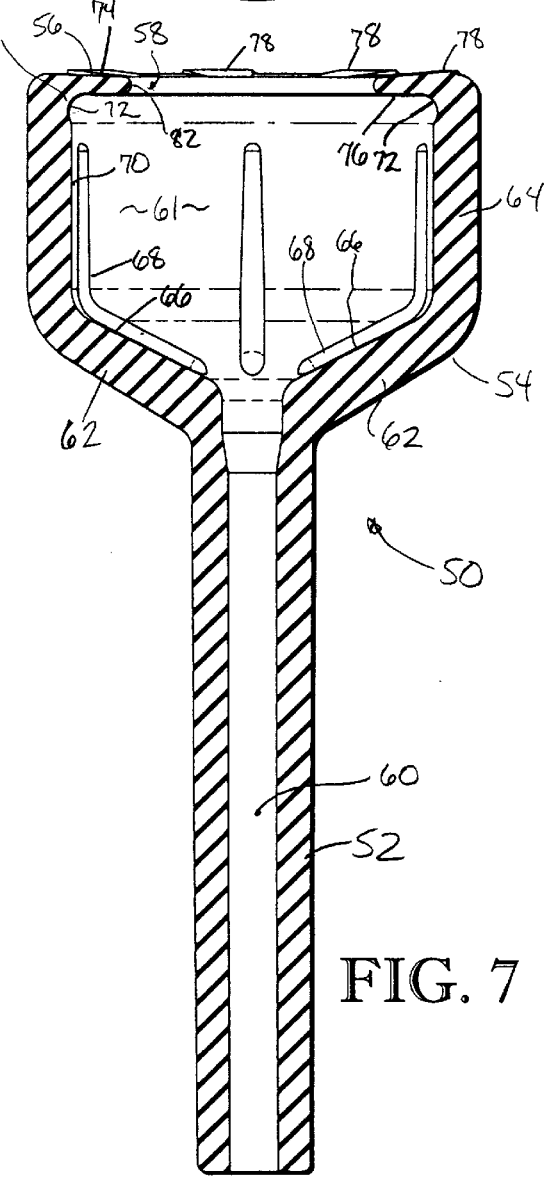
FIG. 7 is a vertical cross-sectional view taken along line 7—7 of FIG. 6, showing the ribs extending from the bottom wall along the interior of the sidewall and the ramping bosses and lip tapered toward the central opening.

The cup 54 of the jetter cup 50 has a bottom wall 62 and a sidewall 64. The bottom wall 62 has an interior side 66 and an exterior side which have similar slopes from the horizontal of about 20° to 40° and more preferably about 25° to 35°. Multiple circumferentially spaced ribs 68 extend radially from the central opening 58 along the interior side 66 of the bottom wall and thence continue upwardly along the inside 70 of the sidewall 64. The ribs 68 are of a thickness to extend inwardly into the cavity 61 about one-eighth to about one-third the thickness of the adjacent bottom wall 62 or sidewall 64. The ribs 68 are divergent as seen in plan in FIGS. 6 and 8 and substantially equally spaced as the extend axially and upwardly around the sidewall 64. A circumferentially extending undercut or annular groove 72 is provided on the inside 70 of the sidewall 64 above the ribs 68 as viewed in FIG. 7 and at the junction 73 between the sidewall 64 and the lip 56. The groove 72 is rounded to avoid any stress points as the lip 56 flexes inwardly and thus provides a reduced thickness on the inside 70 of the sidewall 64 and the lip 56 to facilitate inward bending of the lip 56. The axial extension of the ribs 68 stops below the groove 72 as shown in FIG. 7.

The lip 56 includes an outer surface 74 and an inner surface 76. The inner surface 76 is relatively smooth and uninterrupted to facilitate inward bending, but the outer surface 74 is provided with a plurality of circumferentially spaced ramping bosses 78 as seen in FIGS. 6, 7 and 10. The ramping bosses 78 extend upwardly from the outer surface 74 to increase the thickness of the lip 56 and are generally tapered to decrease in thickness in a direction from the sidewall 64 toward the central opening 58. The ramping bosses 78 are discrete and separated from each other by relatively flat areas 80. Moreover, the lip 56 generally decreases in thickness between the outer surface 74 and inner surface 76 in a direction from the sidewall 64 toward the central opening 58 so that the outer surface 74 slopes downwardly toward the central opening 58. The ramping bosses 78 decrease in thickness toward the central opening 58 so that the inner margin 82 of the lip 56 is rounded and even without bumps.

The jetter cup 50 is preferably molded of a rubber compound and configured for use with a conventional teat cup 84 as shown in FIG. 9. The teat cup 84 includes a shell 86 and a teat cup liner 88 which is generally flexible and of molded rubber. The mouthpiece 90 of the liner 88 extends from the shell 86 and presents an exposed skirt 92 with a lower margin 94, a shoulder 96 and a lip extending inwardly to a central, teat-receiving bore. In use, the teat cup 84 is installed for cleaning by a simple axial thrust of the mouthpiece 90 into the jetter cup 50 which is in a downward direction as viewed in FIG. 9. The entry of the mouthpiece into the central opening 58 causes the lip 56 to yield and bend downwardly. During entry, the ramping bosses 78 engage the shoulder 96 of the mouthpiece 90, thus limiting the area of contact between the mouthpiece 90 and the jetter cup 50. The tapered configuration of the ramping bosses 78 further reduces the force necessary to insert the mouthpiece 90 into the cavity 61.

As the mouthpiece 90 slides over the ramping bosses 78 and into the cavity 61, the lip 56 bends inwardly. The ability of the lip 56 to bend and then return to the sealing position shown in FIG. 9 is enhanced by several features of the jetter cup 50. One is the increased slope of the interior of the bottom wall 62, which not only allows deeper penetration of the mouthpiece 90 into the cavity during insertion but also improves circulation of liquid within the cavity 90. Another is the provision of the annular groove 72 which allows the lip 56 to fully deflect to permit the mouthpiece 90 to move completely past the lip 56 and facilitates its automatic return to the sealing position around the shell 86 and above the lower margin 94 as oriented in FIG. 9. A third feature is the provision of the ribs 68 extending upwardly along the inside 70 of the sidewall 64 which resists caving of the sidewall 64 and thereby enhances the ability of the mouthpiece 90 to fully seat with the cavity 61 by simple axial insertion. Because the ribs 68 support the sidewall 64 and the ramping bosses 78 reduce the frictional engagement between the mouthpiece 90 and the lip 56, the lip 56 is far more responsive in returning to the sealing position.

When the mouthpiece 90 is fully inserted into the cavity 61, it is slightly spaced from the majority of the bottom wall 62 and the sidewall 64 by ribs 68. The lip 56 encloses the mouthpiece 90 within the cavity 61 and seals against the shell 86. CIP and rinsewater solutions are then introduced along the passageway and into the cavity 61, and are free not only to pass into the interior of the teat cup liner 88 as is conventional, but also to fully circulate past the shoulder and the lower margin 94 so as to fully clean the outside of the mouthpiece. The ribs 68 serve to both space the mouthpiece 90 from the bottom wall 62 and sidewall 64 and center the mouthpiece 90 within the cavity 61. The lip 56 does not interfere with the cleaning, but rather is positioned as shown in FIG. 9 without additional jostling, pulling or twisting of the teat cup required to seat the mouthpiece and return the lip 56 to the sealing position. Once cleaning and rinsing is completed, the teat cup 84 is pulled axially from the jetter cup 50 through the central opening 58 and is ready for re-use.

While the differences in the jetter cup 50 of the present invention over the prior art may be subtle, they demonstrate substantial improvements in use and in the effectiveness of the automated cleaning process. Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the doctrine of equivalents to determine and assess the reasonably fair scope of their invention as pertains to any apparatus not materially departing from but outside the literal scope of the invention as set out in the following claims.

What is claimed is:

1. A jetter cup for washing teat cups comprising:
   a cup having a bottom wall and a sidewall defining a cavity;
   a passageway fluidically connected to said cup for the introduction of cleaning liquid into the cavity; and
   an annular lip extending inwardly from the sidewall substantially opposite said bottom wall and defining a central opening therein, said annular lip including an outer surface having a plurality of discrete, circumferentially spaced bosses thereon.

2. A jetter cup as set forth in claim 1, wherein each of said bosses is sloped to present a greater thickness proximate the sidewall and a lesser thickness relatively proximate the central opening.

3. A jetter cup as set forth in claim 1, wherein said bosses are integrally molded into the lip.

4. A jetter cup as set forth in claim 1, wherein each of said bosses is generally trapezoidally shaped and presents a narrower width proximate the central opening and a wider width proximate the sidewall.

5. A jetter cup as set forth in claim 1, wherein a multiplicity of bosses are evenly circumferentially spaced in surrounding relationship to said central opening.

6. A jetter cup as set forth in claim 1, wherein said sidewall is substantially cylindrical and has a plurality of circumferentially spaced ribs extending axially along the inside of the sidewall.

7. A jetter cup as set forth in claim 6, wherein the ribs extend downwardly and along the bottom wall.

8. A jetter cup as set forth in claim 1, wherein the bottom wall has an interior side which is frustoconical presenting a funnel shape toward the passageway and has a slope of about 20° to 40° from the horizontal.

9. A jetter cup as set forth in claim 1, wherein said sidewall has an inside and including a circumferentially extending groove in the inside of the sidewall at a junction between the sidewall and the lip.

10. A jetter cup for washing teat cups comprising:
    a cup having a bottom wall and a sidewall extending angularly therefrom to define a cavity adapted for receipt of a mouthpiece of a teat cup therein;
    a passageway fluidically communicating with said cavity for the introduction of liquid into the cavity; and
    an annular lip extending inwardly from said sidewall and defining a central opening,
    wherein said cup includes a plurality of axially extending ribs circumferentially spaced along said sidewall.

11. A jetter cup as set forth in claim 10, wherein said ribs extend continuously from said sidewall onto said bottom wall.

12. A jetter cup as set forth in claim 11, wherein said ribs are convergent along said bottom wall toward said passageway.

13. A jetter cup as set forth in claim 12, wherein said sidewall is substantially cylindrical and said passageway extends through said bottom wall in a substantially centered relationship to said bottom wall and said sidewall.

14. A jetter cup as set forth in claim 13, wherein the bottom wall has an interior side which is frustoconical presenting a funnel shape toward the passageway and has a slope of about 20° to 40° from the horizontal.

15. A jetter cup as set forth in claim 10, wherein said annular lip includes an outer surface having a plurality of discrete, circumferentially spaced bosses thereon.

16. A jetter cup as set forth in claim 15, wherein each of said bosses is sloped to present a greater thickness proximate the sidewall and a lesser thickness relatively proximate the central opening.

17. A jetter cup as set forth in claim 15, wherein said bosses are integrally molded into the lip.

18. A jetter cup as set forth in claim 15, wherein each of said bosses is generally trapezoidally shaped and presents a narrower width proximate the central opening and a wider width proximate the sidewall.

19. A jetter cup as set forth in claim 15, wherein a multiplicity of bosses are evenly circumferentially spaced in surrounding relationship to said central opening.

20. A jetter cup as set forth in claim 10, wherein said sidewall has an inside and including a circumferentially extending groove in the inside of the sidewall at a junction between the sidewall and the lip.

21. A jetter cup for washing teat cups comprising:
    a cup having a bottom wall and a sidewall extending angularly therefrom to define a cavity adapted for receipt of a mouthpiece of a teat cup therein;
    a passageway fluidically communicating with said cavity for the introduction of liquid into the cavity; and
    an annular lip extending inwardly from a junction with said sidewall and defining a central opening, said lip and said sidewall being integrally formed;
    said sidewall including a inside and a groove extending around the inside of said sidewall at the junction with the lip.

22. A jetter cup as set forth in claim 21, wherein said sidewall is substantially cylindrical and said groove extends circumferentially around the inside of the sidewall.

23. A jetter cup as set forth in claim 21, wherein said annular lip includes an outer surface having a plurality of discrete, circumferentially spaced bosses thereon.

24. A jetter cup as set forth in claim 21, wherein said sidewall is substantially cylindrical and has a plurality of circumferentially spaced ribs extending axially along the inside of the sidewall.

* * * * *